June 20, 1967
R. S. WATERS
3,325,849
MECHANICAL AGITATOR FOR A VACUUM CLEANER
Filed Sept. 8, 1964
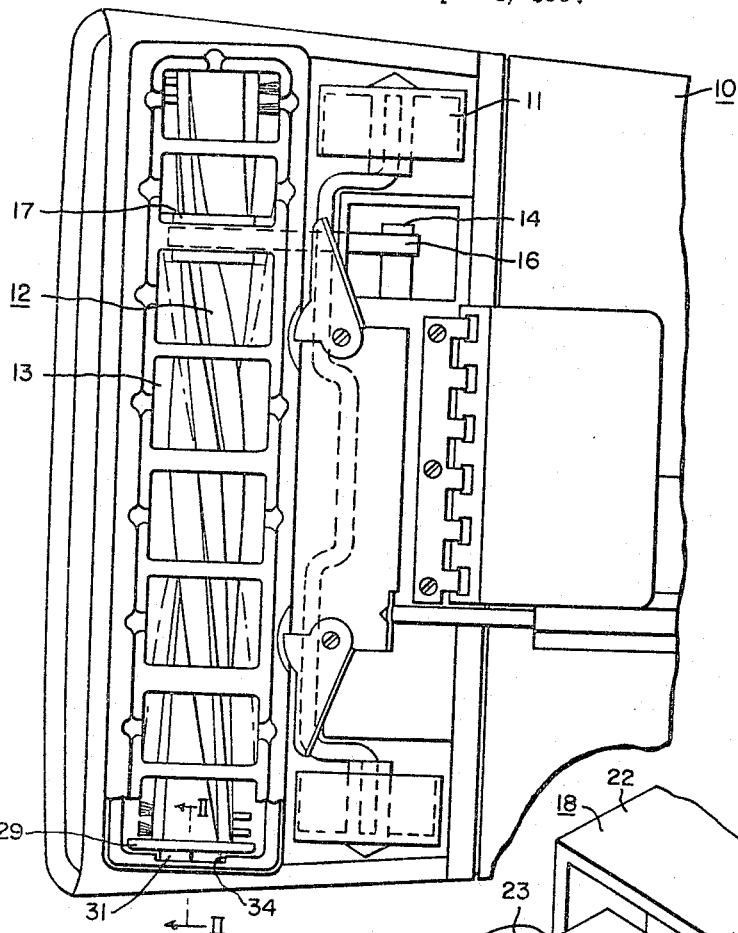
FIG. 1.
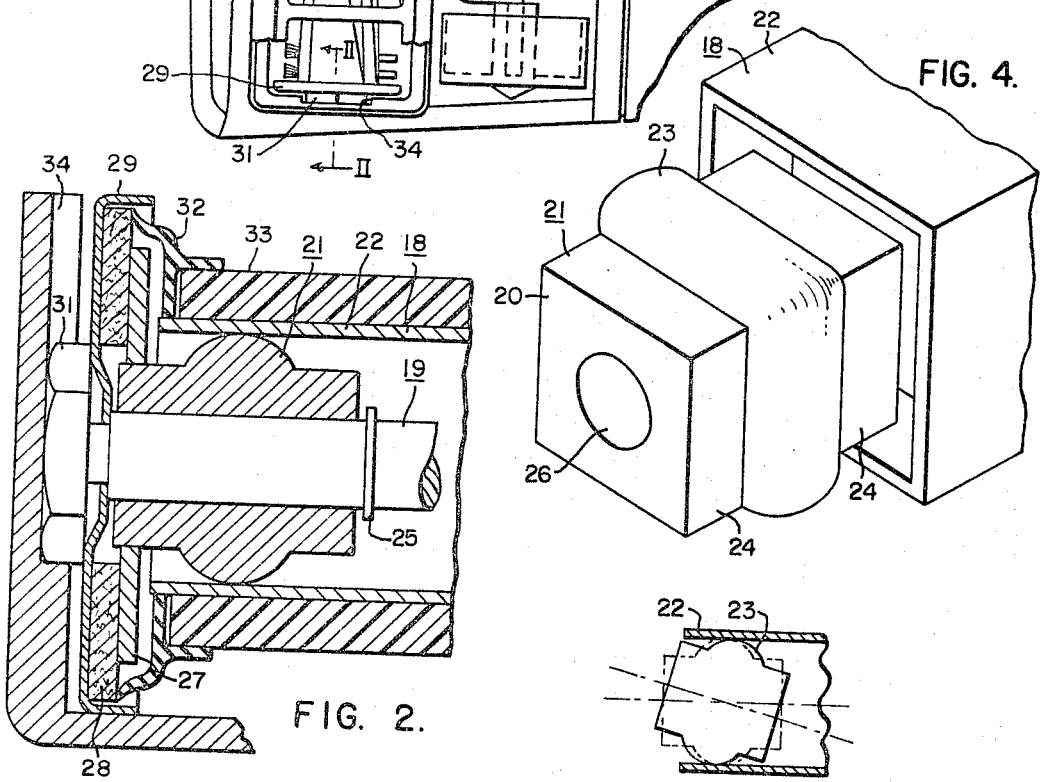
FIG. 2.
FIG. 4.
FIG. 3.

United States Patent Office 3,325,849
Patented June 20, 1967

3,325,849
MECHANICAL AGITATOR FOR A VACUUM
CLEANER
Robert S. Waters, Lexington, Ohio, assignor to Westinghouse Electric Corporation, Pittsburgh, Pa., a corporation of Pennsylvania
Filed Sept. 8, 1964, Ser. No. 394,756
3 Claims. (Cl. 15—392)

This invention relates to upright vacuum cleaners in general and, in particular, to mechanical agitators and bearings therefor which are utilized in a cleaner of this type.

Mechanical agitators of the type herein contemplated comprise a shell structure and ball or sleeve bearings rotatably mounting the shell structure on a nonrotatable shaft that projects from each end of the shell and is suitably secured in the cleaner housing. Due to the extremely competitive nature of the vacuum cleaner industry, it is desirable to maintain manufacturing costs at a minimum. To this end sleeve bearings are utilized in lieu of the more expensive ball bearings.

From the standpoint of wear and optimum performance, it is desirable to utilize sleeve type bearings which are self-aligning, the most conventional bearings of this type being spherical in shape and mounted in a spherical seat to provide alignment. Self aligning bearings of this type, which must be securely clamped in place to prevent rotation, are not suitable in an application where the bearings must be free to rotate with the shell structure.

Self-aligning bearings are particularly useful in an arrangement of this type where, because of the internal design of the cleaner in the area of the mechanical agitator, the pulley or the like associated therewith for driving thereof is not positioned in the center. Due to the off-center position of the pulley, a greater force is imparted to one of the bearings supporting the shell structure on the shaft. This will eventually produce uneven wear of the bearings, consequently, curtailing the life thereof while adversely affecting the proper operation of the apparatus.

Accordingly, it is the general object of this invention to provide a new and improved mechanical agitator for vacuum cleaners.

It is a more particular object of this invention to provide a new and improved bearing for mechanical agitators that is self-aligning in all directions and which is capable of rotating with the agitator.

Another object of this invention is to provide a new and improved self-aligning bearing which can be made inexpensively by simple manufacturing techniques.

Briefly, the present invention accomplishes the above-cited objects by providing a bearing having noncircular portions, the bearing being insertable in noncircular end portions of the shell structure of the agitator. The bearing is provided with an intermediately disposed enlarged radial portion which is adapted to abut the inner walls of the shell structure thereby serving as a pivot point about which the bearing can move in order to effect proper alignment between the shell structure mounted on the bearings and the bearings. The end portions of the shell structure and the intermediate portions of the bearings each have the same number of sides and are so dimensioned with respect to each other so as to render it impossible for the bearing to rotate within the shell structure. In other words the bearing and shell will always rotate together.

Further objects and advantages of the invention will become apparent as the following description proceeds and features of novelty which characterize the invention will be pointed out in particularity in the claims annexed to and forming a part of this specification.

For a better understanding of the invention reference may be had to the accompanying drawings in which:

FIGURE 1 is a partial, bottom plan view of a vacuum cleaner incorporating one embodiment of the invention;
FIG. 2 is a cross-sectional view taken on the line II—II of FIG. 1;
FIG. 3 is a schematic view illustrating two positions of the bearing within the shell structure of the mechanical agitator; and
FIG. 4 is a perspective view showing the spacial relationship of the end portions of the shell structure and the bearing prior to assembly.

Referring to the drawings, especially FIG. 1, reference character 10 designates generally a vacuum cleaner having front wheels 11 and rear wheels (not shown) for movably supporting the cleaner. The cleaner 10, commonly referred to as an upright vacuum cleaner, is provided with a mechanical agitator generally indicated 12, which is disposed in the inlet of a suction nozzle 13. Power for driving the agitator 12 is obtained from an electric motor (not shown) having a shaft 14 which, due to the internal construction of the cleaner, extends to one side thereof. A drive belt 16 interconnects the shaft 14 with a pulley 17 and is effective to transmit power from the electric motor (not shown) to the pulley 17, the pulley being mounted on the agitator closer to one end thereof such that it is directly in line with the motor shaft 14.

The mechanical agitator, which is of the type more fully shown and described in applicant's copending patent application Ser. No. 383,036 filed July 16, 1964, now abandoned and assigned to the same assignee as this invention, comprises a shell structure or body member 18 (see FIGS. 2 and 4) rotatably supported on a nonrotating shaft 19 by a pair of sleeve bearing structures 21 provided at each end thereof. The shell structure 18 may be square in cross section throughout its entire length, as disclosed in applicant's copending patent application hereinabove referred to, or it may be of any cross section intermediate a pair of end portions 22 which are square in cross section as herein disclosed. While the end portions are illustrated as square, it will be understood that they may have any non-circular cross section.

The bearing structure 21 having a body member 20, made from any suitable material, for example, metal, is provided with an enlarged circumferentially continuous radial portion 23 positioned intermediate terminal portions 24 which may be square in cross section or any other noncircular configuration. The bearing is provided with a longitudinal bore 26 adapted to receive one end of the shaft 19. Any suitable means, such as a lock ring 25 (FIG. 2), is provided near the ends of the shaft to serve as a shoulder for preventing the bearing from moving toward the center of the shaft.

When the mechanical agitator 12 is assembled, the shaft 19 with the bearings 21 mounted thereon is disposed within the shell structure 18; however, the end portions of the shaft 19 and the terminal portions 24 of the bearings 21 extend slightly beyond the ends of the shell (see FIG. 2). The outermost terminal portions 24 are adapted to carry a thrust plate 27, which rotates against a stationary felt washer 28 and while it is positively driven by the bearing 21, it is free to align itself with the felt washer. A cover plate 29, secured to the end of the shaft 19 by a nut 31, is adapted to retain the felt washer and thrust plate between it and the end portions 22 of the shell structure. To prevent foreign particles from interfering with proper functioning of the bearings, a flexible gasket 32 is provided which cooperates with the cover plate and a bristle carrying extrusion 33 in an obvious manner. When the assembly has been completed, the space between the felt washer 28 and the end portions 22 is always greater than the thickness of the thrust plate 27, but is held close enough so that the shell structure cannot move far in either direction without hitting the thrust plate.

A pair of slots 34 provided at the inner sides of the nozzle structure 13 in the area of the inlet are adapted to receive the nuts 31 and to maintain the shaft 19 in a stationary position while the shell structure 18, bristle carrying extrusion 33 and bearings 21 are free to rotate.

Referring to FIG. 3, it can be seen that the enlarged radial portions 23 abut the inner surfaces of the end portions 22 and cooperate therewith to serve as pivot points about which the bearing 21 is free to oscillate in all directions to thereby effect self-alignment.

While there has been shown and described what is at present considered to be the preferred embodiment of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

What is claimed is:

1. A brush roll for suction cleaning apparatus comprising: an elongated body member having noncircular end portions and a longitudinal passage therethrough, a bearing structure provided in each end of said body member supporting the same for rotational movement, each said bearing structure being provided with a longitudinal bore for receiving one end of a shaft adapted to be mounted in the cleaning apparatus and having a circumferentially continuous projection intermediate terminal portions, said noncircular end portions being adapted to cooperate with said noncircular projection for effecting simultaneous rotation of said bearing structure with said body member and for permitting tilting of said bearing with respect to all sides of said noncircular end portion.

2. Structure as specified in claim 1, wherein said end portions and said terminal portions are square in cross section.

3. Structure as specified in claim 1, wherein said projection is noncircular.

References Cited

UNITED STATES PATENTS

| 278,404 | 5/1883 | Crowell | 308—29 |
| 1,325,849 | 12/1919 | Hoover | 308—238 |
| 1,638,797 | 8/1927 | Claus | 308—237 X |
| 2,244,943 | 6/1941 | Dow | 15—392 |
| 2,609,253 | 9/1952 | Brown | 308—29 X |

FOREIGN PATENTS

| 991,402 | 6/1951 | France. |
| 15,036 | 6/1897 | Switzerland. |

ROBERT W. MICHELL, *Primary Examiner.*